(12) United States Patent
Martinez et al.

(10) Patent No.: US 6,259,808 B1
(45) Date of Patent: *Jul. 10, 2001

(54) THERMAL TRANSFER MICR PRINTER

(75) Inventors: Phillip M. Martinez, Groton; Scott J. Longrod, Lansing, both of NY (US)

(73) Assignee: Axiohm Transaction Solutions, Inc., Ithaca, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/131,112

(22) Filed: Aug. 7, 1998

(51) Int. Cl.[7] ........................................ G06K 9/00
(52) U.S. Cl. ........................ 382/139; 400/55; 400/58; 235/375
(58) Field of Search .................... 382/139, 138, 382/140, 207, 320, 137, 135; 235/379, 449; 400/58, 55

(56) References Cited

U.S. PATENT DOCUMENTS

| | | | |
|---|---|---|---|
| 4,232,216 | * | 11/1980 | Helle ................................ 235/449 |
| 4,243,983 | * | 1/1981 | Vyas ................................. 340/674 |
| 5,308,959 | * | 5/1994 | Cherry ............................... 235/379 |
| 5,613,783 | * | 3/1997 | Kinney et al. ....................... 400/73 |
| 5,825,506 | * | 10/1998 | Bednar et al. ...................... 358/402 |
| 5,825,946 | * | 10/1998 | Del Signore, II et al. ......... 382/320 |
| 5,956,862 | * | 10/1999 | Momose ............................. 235/449 |
| 5,997,192 | * | 12/1999 | Martinez et al. ................... 400/58 |
| 6,012,633 | * | 1/2000 | Ochiai et al. ..................... 235/379 |
| 6,155,483 | * | 12/2000 | Chupka et al. ................... 235/379 |

* cited by examiner

Primary Examiner—Thomas Black
Assistant Examiner—Jacques Veillard
(74) Attorney, Agent, or Firm—Salzman & Levy

(57) ABSTRACT

A transaction printer includes the MICR encoding of indicia at a precise location called the amount field. In order to accomplish this, an optical sensor is provided in a transaction printer at a point-of-sale, to detect the edge of the check and stage it at a known location from the thermal, MICR print head. A clutch mechanism is used to engage the print head with a platen, and to engage two MICR read heads with the check, so that indicia can be sequentially imprinted and read within the transaction printer in a single, sequential operation.

1 Claim, 5 Drawing Sheets

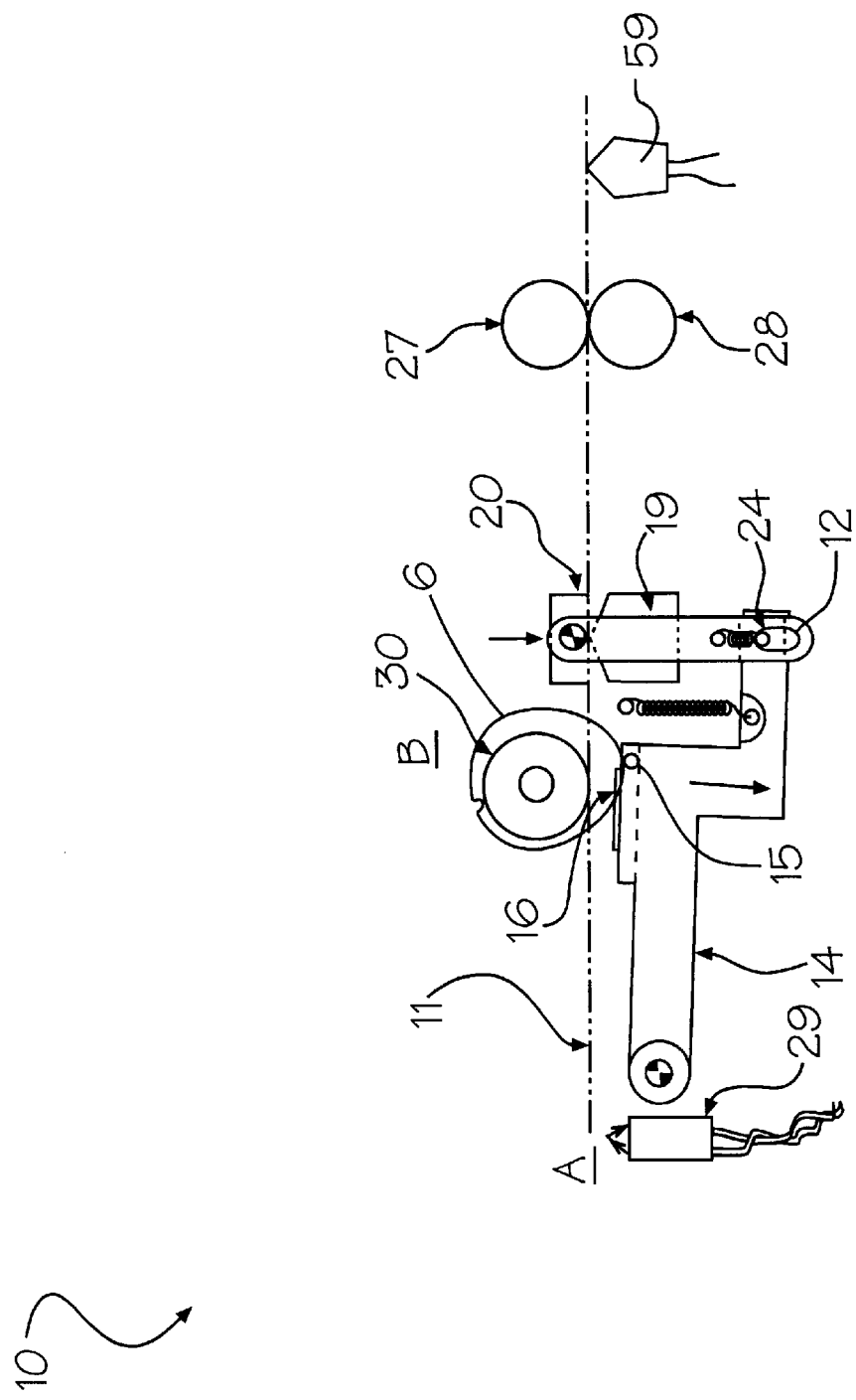

THERMAL TRANSFER MICR PRINTER

FIELD OF THE INVENTION

The present invention relates to a point-of-sale transaction printer and, more particularly, to a point-of-sale transaction printer having a thermal printer for imprinting a check with MICR characters, and two MICR read heads.

BACKGROUND OF THE INVENTION

In present day point-of-sale (POS) operations, the MICR indicia that are to appear on the check of a customer are added after the sale, and at a remote location (i.e., either at the bank, or in a separate, back room, retail site).

For the first time, this invention seeks to eliminate the post-operative role of supplying the required MICR indicia on a check presented for POS payment at a retail establishment. Owing to its new function, transaction printers now being designed by the present assignee of this invention, must be able to encode and read MICR located in a specific field (i.e., the amount field) of the check at the point-of-sale.

In a MICR encoder of the new machine, the MICR characters must be printed at a precise distance to the right edge of the check in order to place the MICR in the proper field site. In order to accomplish this, an optical sensor is provided to detect the edge of the check and stage it at a known location from the thermal, MICR print head. It then becomes an easy matter to advance the check by a stepper, drive and print motor a fixed number of step increments in order to start the printing sequence.

In addition, it is essential that the encoded MICR characters be verified after printing to assure their accuracy. The MICR indicia imprinted upon each check extend to each edge on the left and right of the check to within 0.31 inches. By adding an additional (second) read head, the movement of the check is minimized and the check feeding mechanism may be greatly simplified.

SUMMARY OF THE INVENTION

In accordance with the present invention, there is provided a transaction printer for encoding and subsequently reading MICR indicia upon a check presented for payment at a point-of-sale transaction printer. The machine comprises a presenting zone, where the check is presented to the machine with a specific facial orientation. The check is fed into the machine by a pair of drive rollers. The check passes an encoding MICR print head in a printing zone. A reflective optical sensor disposed at the presenting zone, stages the check for various positions with respect to MICR printing. As the check is fed backwardly towards the presenting zone, the lead edge of the check is sensed by the optical sensor. The sensor generates a signal in response to the sensing of the lead edge. This signal is sent to the drive rollers, commanding them to stop feeding the check. The check is now positioned for printing (encoding) the MICR characters in the amount field of the check. After the MICR indicia has been encoded by a thermal transfer printer, the drive rollers clamp and grip the check, and the check is driven past a secondary read head of the check processing machine at which the just-printed MICR characters are verified. The edge of the check is again sensed by the optical sensor, which sends a signal to stop the drive rollers. The MICR indicia in the amount field are then read by the secondary read head. Afterward, the check is driven out of the check processing machine, and presented to the operator. The drive rollers are then opened to allow the operator to remove the check.

Novel to the thermal transfer printer of the check processing machine is a bi-directional clutch, which provides proper sequencing of indicia printing and reading. The bi-directional clutch comprises an internal pawl that engages a detent notch in a cam that raises and lowers a platen lift arm controlling the print platen, as the check is positioned for MICR imprinting and reading operations.

Another novel feature of this invention resides in the single stepper motor drive for the bi-directional clutch. All the sequencing between printing of the MICR indicia, and the reading and verifying of the MICR, can be accomplished in one sequential operation. This is due to the novel single stepper drive and bi-directional clutch, which allow the check to be processed in one continuous back-and-forth motion along the feed path of the check processing machine. The check is first introduced into the machine, and the bi-directional clutch is rotated clockwise from a home position to a MICR encode position. Then, the clutch is rotated further clockwise to a MICR read position. The clutch is then further rotated clockwise to the home position, and then it is driven from the machine by the drive rollers.

It is an object of this invention to provide a check processing machine for encoding and verifying MICR indicia on a check at a point-of-sale.

It is another object of the invention to provide an improved check processing machine wherein a check is imprinted with MICR indicia in the amount field of the check at the point-of-sale.

It is a further object of this invention to provide a check processing machine that can imprint MICR indicia and read the MICR indicia in one sequential operation.

It is yet another object of the invention to provide a check processing machine that can process a check in a single, sequential operation as a result of a novel bi-directional clutch that is driven by a single stepper drive motor.

It is a further object of this invention to provide a MICR encoding and reading apparatus that features two read heads for reading both the indicia in the amount field, and the MICR characters in the other remaining fields.

BRIEF DESCRIPTION OF THE DRAWINGS

A complete understanding of the present invention may be obtained by reference to the accompanying drawings, when considered in conjunction with the subsequent detailed description, in which:

FIG. 3 shows a schematic view of a transaction printer in a third check handling position corresponding to reading of the imprinted MICR characters on the check;

For purposes of clarity and brevity, like elements and components will bear the same designation and numbering throughout the figures.

DESCRIPTION OF THE PREFERRED EMBODIMENT

Generally speaking, the invention features a transaction printer that encodes and reads MICR indicia at a point-ofsale. A sensor is provided in the MICR encoding machine to detect the edge of the check and allow precise registration of the check for subsequent printing of the MICR characters. The sensor also provides check location information to the control electronics for reading and verifying the encoded indicia. Two read heads are provided to read the MICR indicia in all the MICR encoded fields, in order that the encoding and reading of the MICR characters can be accomplished in a single processing operation.

Figure 1:
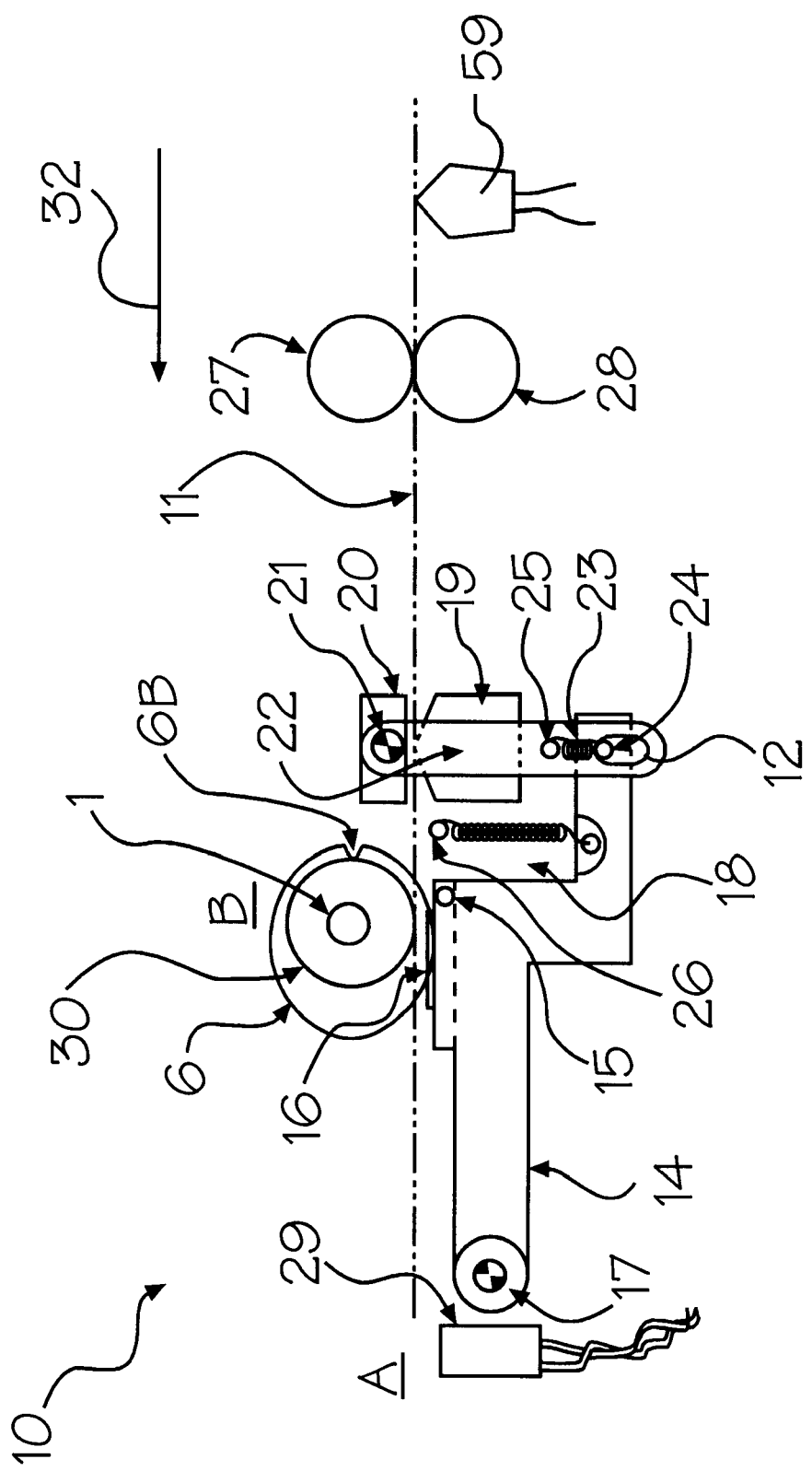
FIG. 1 illustrates a schematic view of a transaction printer in a first check handling position corresponding to the insertion of a check.

Referring to FIG. 1, a transaction printer 10 is shown. A check (not shown) is inserted into the check processing apparatus 10 at point A with a face down orientation. The check is fed into the apparatus 10, along the check feed path 11. The apparatus 10 is designed to encode the check with MICR indicia at the point-of-sale. To provide the MICR characters a MICR encoder print head 16, and a MICR verifying reader 19, are disposed along feed path 11. A MICR secondary read head 19, and a primary, read head 59 are disposed along feed path 11. The read head 19 is used to verify the MICR imprinted in the amount field of the check. The primary read head 59 is used to read all the other MICR indicia in the assigned fields of the check. The engagement of the primary read head 59 is controlled by the bi-directional clutch 50 in similar fashion as that of the secondary read head 19, as explained hereinafter.

A pressure pad 20 is located above the MICR read head 19. This pressure pad presses the check, or other printed media, against the read head 19 to ensure good contact. A link 22 is connected to the pressure pad 20 through a pivot pin 21. A slot 12 at the distal end of the link 22, causes the link to be guided by link pin 24, which is fixedly attached to the end of the print head arm 14. The print head arm 14 is biased upwardly (arrow 33, FIG. 2) via spring 18 that is anchored to the housing pin 26. The pin 24 which rides in slot 12, is biased against the upper end of slot 12 by the tension spring 23 that is attached at its other end to pin 25. The spring 23 provides the contact force for pressure pad 20, as pin 24 moves away from pin 25 guided by the slot in link 22. The check, or other media, is driven by feed rollers 27 and 28, which are part of the point-of-sale printer (not shown), which is positioned to the rear of the check processing apparatus 10.

A reflective optical sensor 29 disposed at point A, stages the check for the various positions of the MICR print mechanism. In the home position 1, shown in FIG. 1, the cam 6 holds the print head 16 away from the platen 30 by bearing against pin 15. Pressure pad 20 is also held away from the MICR read head 19 in the home position, as previously mentioned. Therefore, a check or other media can now be inserted into the print zone B of the check processing apparatus 10. Feed rollers 27 and 28, which are normally separated, are now clamped together to grip the inserted check, and feed it into the main printer unit for validation of account information on the check. The feed rollers 27 and 28 are rotated by a stepper motor (not shown). The check is driven back out (arrow 32) when the account validation operation is complete. The feed rollers 27 and 28 stop feeding the check when the lead edge of the check is detected by the reflective optical sensor 29 at point A. The check is now positioned for printing (encoding) of the MICR characters in the amount field of the check.

Figure 2:
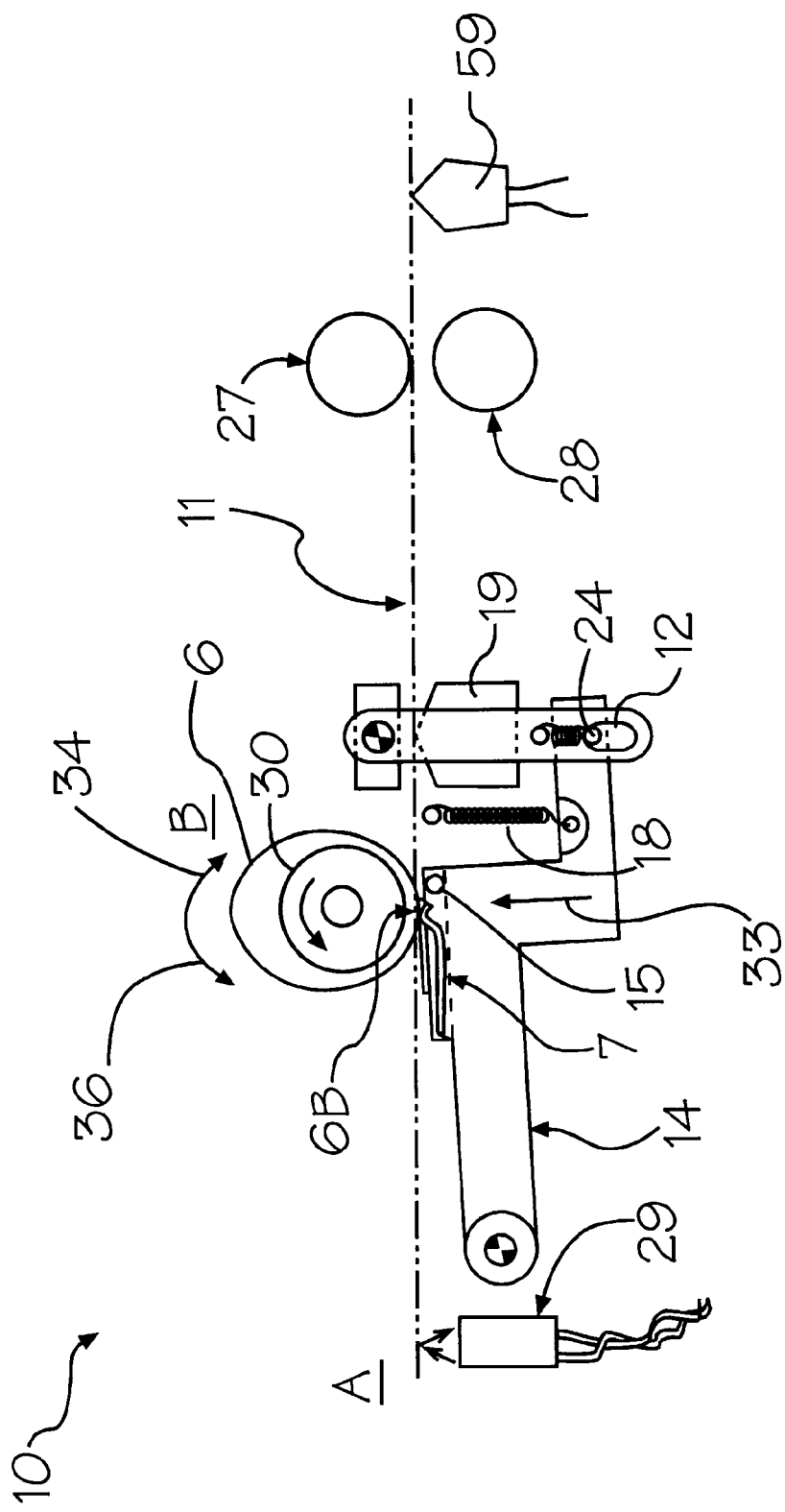
FIG. 2 depicts a schematic view of a transaction printer in a second check handling position corresponding to the MICR encoding of indicia thereupon.

Referring to FIG. 2, position 2 of the check processing apparatus 10 is illustrated. In this position, also known as the MICR encode position, cam 6 rotates clockwise (arrow 34), so that there is now clearance between the cam 6 and pin 15. This allows the print head 16 to press a print ribbon (not shown) and the check against platen 30. A detent spring 7 engages in a suitable notch 6B in the cam to hold the cam position. The cam 6 and platen 30 are both rotatively fixed upon the power input shaft 1. The cam 6 or platen 30 are selectively driven by the shaft 1, when the shaft 1 rotates either clockwise (arrow 34) to drive cam 6, or counterclockwise (arrow 36, FIG. 2) to drive the platen 30. This is accomplished by a bi-directional clutch mechanism 50 disposed within the cam 6, as explained hereinafter with reference to FIGS. 4a, 4b, and 5. Shaft 1 is driven in the counter-clockwise direction 36, in order to drive the platen 30 in the same direction. The edge of the check is detected by the reflective optical sensor 29 at point A. This commands the control electronics of the check processing apparatus 10 to start energizing the heater elements on the print head 16, which melts and transfers a wax-based ink from the ribbon to the check, thereby forming the MICR characters. It should be noted that feed rollers 27 and 28 are disengaged (opened), before platen 30 starts rotating. Pressure pad 20 and MICR read head 19 are also held apart.

Referring to FIG. 3, the third position of apparatus 10, is shown. In this position, the MICR indicia printed upon the check are read. Feed rollers 27 and 28 are clamped together and grip the check after the MICR indicia has been printed. Power input shaft 1 rotates clockwise and drives the cam 6 half-way to its high point. In this position, there is clearance between the print head 16 and platen 30, and also between pressure pad 20 and the MICR read head 19. The check is then driven back out of the apparatus 10, where it is detected by the reflective optical sensor 29, which stops the feed rollers 27 and 28. Shaft 1 continues rotating clockwise and drives cam 6 to its high point against pin 15, and stops. This allows pressure pad 20 to contact and press the check against the MICR read head 19. Feed rollers 27 and 28 then drive the check past the MICR read head 19, which verifies the printed MICR characters. Cam 6 is then rotated clockwise back to position 1, so that there is again clearance between print head 16 and platen 30, and pressure pad 20 and the MICR read head 19. Feed rollers 27 and 28 then drive the check back out of the check processing apparatus 10 and present it to the operator. Feed rollers 27 and 28 open to allow removal of the check. The mechanism is now back at the home position (FIG. 1) and is now ready for another point-of-sale transaction.

It will be obvious that if the main MICR read head 59 were to be used to verify the encoded MICR characters in the amount field, that drive rolls 27, 28 would not be sufficient to provide movement for the check (not shown) in a manner that would allow reading characters near the edge of the check. The novel addition of a secondary MICR read head 19 allows for a simplified paper moving system consisting of only drive rolls 27, 28 and eliminates the need for additional drive rolls in the transaction printer/check encoding apparatus.

It can be observed that the optical sensor 29 plays a very important role in the processing of MICR imprinting and reading. The amount field must be precisely and accurately ascertained for both operations, and the sensing of the leading edge of the check precisely locates the amount field upon the check being processed. It then becomes an easy matter to advance the check by a stepper drive and print motor a fixed number of step increments in order to start the printing or read sequences.

Figure 4B:
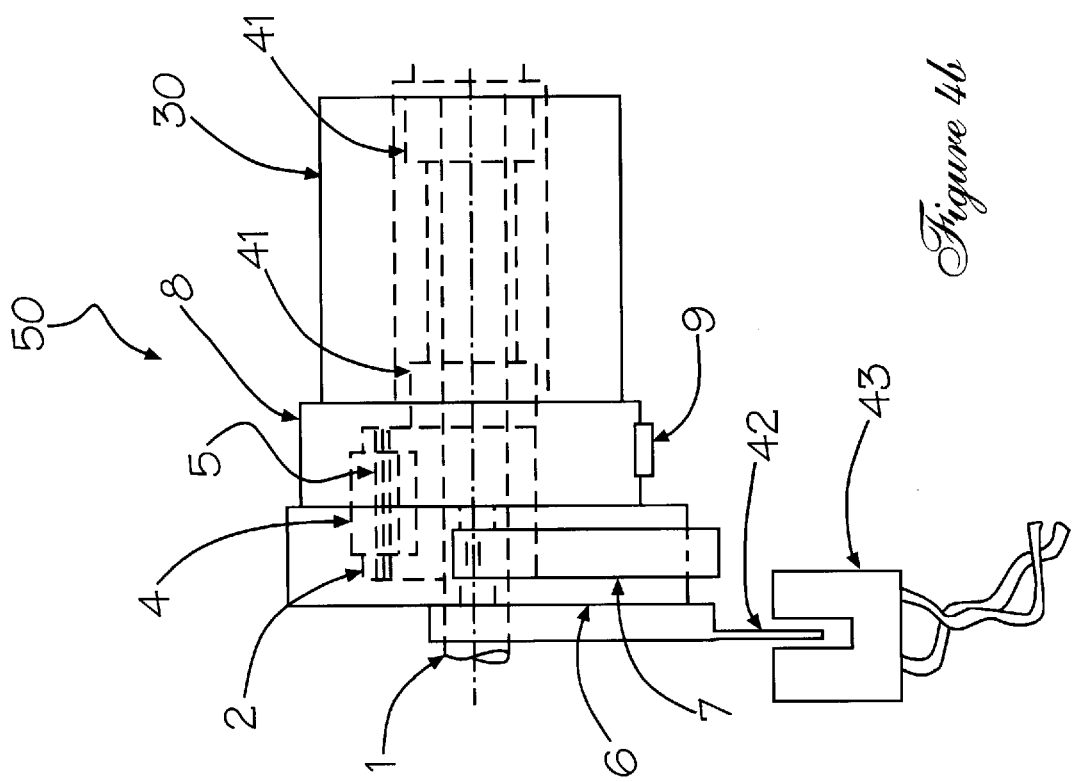
FIGS. 4a and 4b illustrate respective, front cut-away and side views of a bi-directional clutch for driving the platen and print head arm lift cam, shown in FIGS. 1 through 3.
Figure 4A:
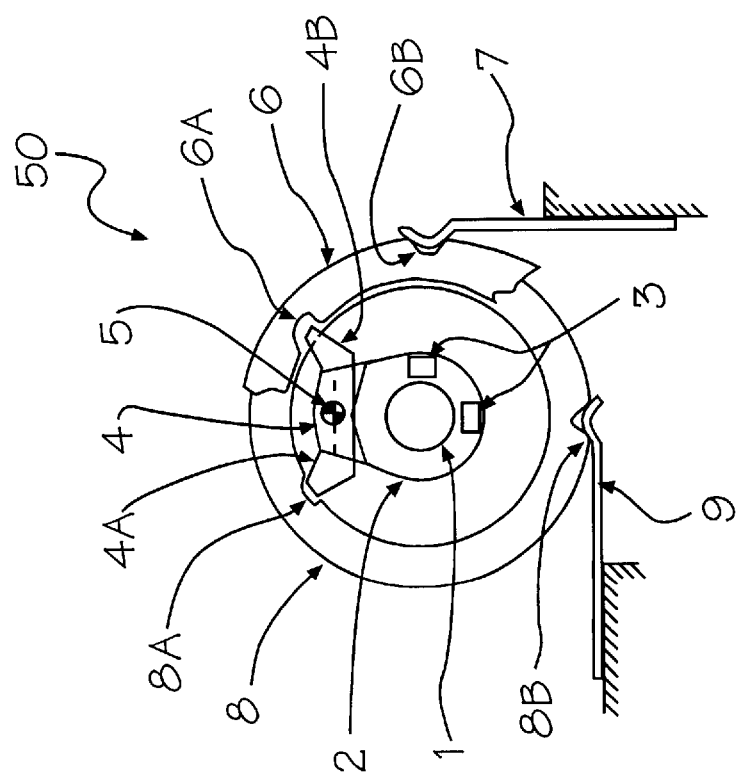

Now referring to FIGS. 4a and 4b, respective frontal cut-away and side views are shown of the bi-directional clutch 50, which drives cam 6 and platen 30. A drive dog 2 is fixedly coupled to the input shaft 1 via set screws 3. A drive pawl 4 is pivotally attached to the drive dog 2 via pivot pin 5. The pawl tooth 4a ramps away from the angular detent surface of notch 8a disposed in clutch surface 8, when the shaft 1 is rotated in the clockwise direction (arrow 34, FIG. 2). The tooth 4a then engages in notch 6a disposed on cam 6. The cam 6 is normally held in position by leaf spring 7, which engages detent notch 6b. As the drive dog 2 continues to rotate in the clockwise direction (arrow 34), the detent force of leaf spring 7 is overcome, and the cam 6 will rotate to the MICR encode position shown in FIG. 2.

The pawl tooth 4b ramps away from the angular detent surface 6a in cam 6, when the shaft 1 rotates in the counterclockwise direction (arrow 36, FIG. 2). The leaf spring 9 normally disposed in the detent 8b of the clutch surface 8, and which holds same in position, is overcome by the counter-rotative force, allowing the check processing apparatus 10 to achieve the MICR read position shown in FIG. 3. The clutch 50 is driven by a stepper motor 40, the shaft 1 of which supports platen 30 via bearings 41, shown in FIG. 4b. An arm 42 attached to shaft 1 passes through an optical sensor 43, as shown. The optical sensor 43 detects a home position of stepper motor 40, and hence the position of the cam 6.

Figure 5:
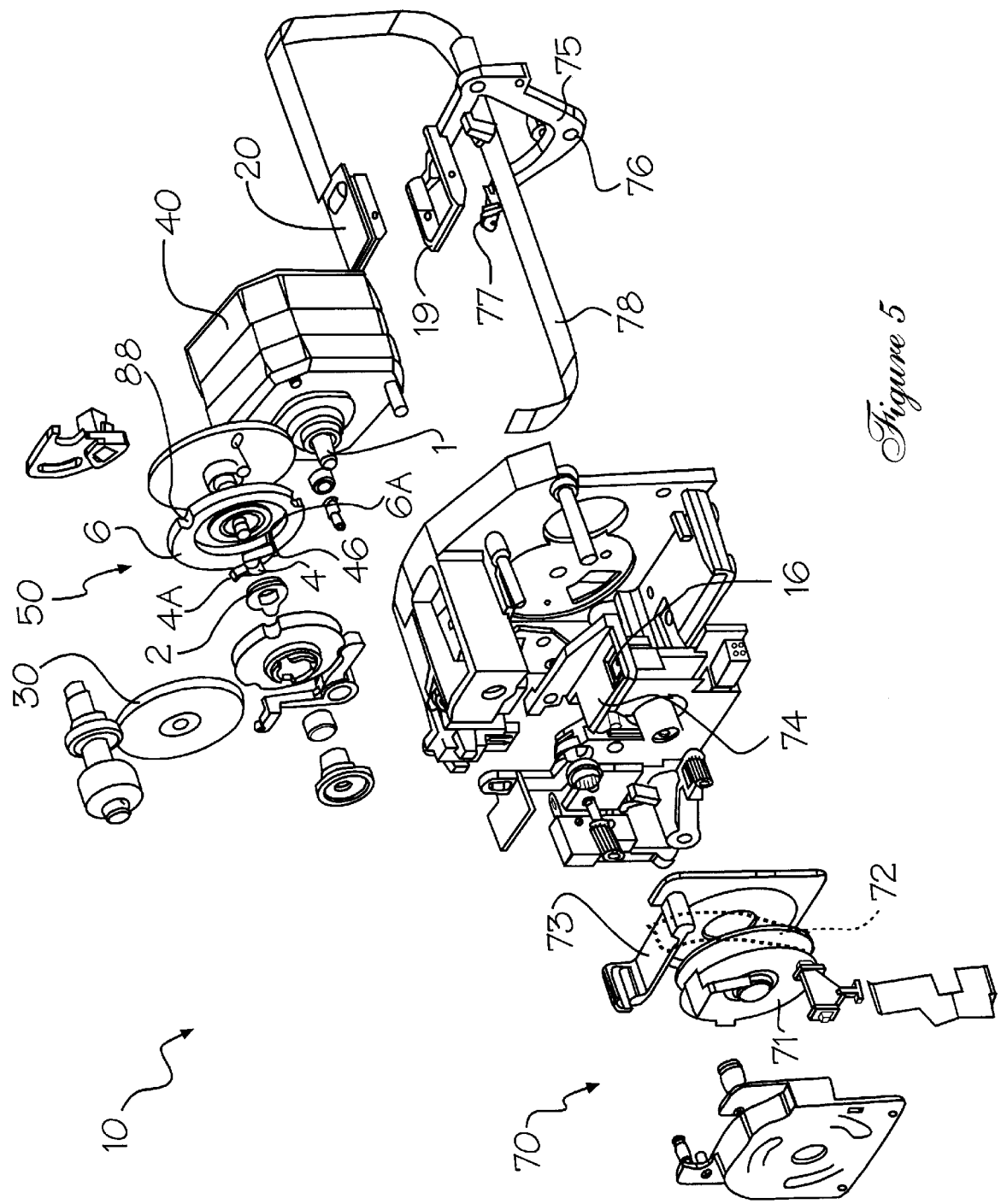
FIG. 5 depicts a perspective, exploded view of the transaction printer shown schematically in FIGS. 1 through 3, and including the bi-directional clutch illustrated in cutaway in FIGS. 4a and 4b.

Referring to FIG. 5, an exploded, perspective view of the actual check processing apparatus 10 is shown. A cassette 70 contains a roll 71 of thermal ribbon 72. The ribbon 72 is moved across the stage 73 of cassette 70, as the roll 71 is rotated by shaft 1. The ribbon 72 is at a level over the surface 74.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

The present invention is particularly directed to use in a transaction printer which will employ varying features and functions, described in differing aspects, in any one or more of the following group of copending patent applications, all filed concurrently on Aug. 7, 1998: AXI-126 to Martinez et al for "COMPACT RIBBON CASSETTE", Ser. No. 09/130, 598; AXI-140 to Martinez for "RIBBON CASSETTE HAVING END OF RIBBON SENSING", Ser. No. 09/130,716; AXI-141 to Rowlands for "POINT-OF-SALE MICR PRINTING AND READING", Ser. No. 09/130,811; AXI-143 to Turner for "RIBBON CASSETTE FOR IMPACT PRINTER", Ser. No. 09/130,699; AXI-145 to Martinez et al for "COMPACT RIBBON CASSETTE WITH INTEGRAL FRICTION PLATE", Ser. No. 09/131,189; AXI-146 to Martinez et al for "COMPACT RIBBON CASSETTE WITH MESHING GEAR POSITIVE DRIVE", Ser. No. 09/130,715; AXI-147 to Martinez et al for "THERMAL TRANSFER MICR PRINTER", Ser. No. 09/131,110; AXI-149 to Walls et al for "CHECK PROCESSING", Ser. No. 09/131,111; and AXI-150 to Martinez et al for "CHECK PROCESSING MICR PRINTER AND ENCODER", Ser. No. 09/130,700.

What is claimed is:

1. A check processing machine including a transaction printer for encoding and reading MICR indicia upon a check at a point-of-sale in a single, sequential operation, said check processing machine, comprising:

means defining a check processing feed path;

means disposed along said check processing feed path for feeding said check along said check processing feed path;

a MICR encoding zone disposed along said feed path, said MICR encoding zone comprising a
   bi-directional clutch, a platen and a print head for capturing a check therebetween, when
   brought into engagement with each other by said bi-directional clutch;

drive means including a stepper motor operatively connected to said bi-directional clutch for driving said bi-directional clutch to engage said platen with said print head;

sensing means operatively connected to said stepper motor for determining a home position for said stepper motor, whereby MICR indicia can be imprinted in an amount field upon said check;

a pair of spaced apart MICR read heads disposed along said feed path for reading imprinted MICR indicia.

* * * * *